US011873918B1

(12) United States Patent
Scott et al.

(10) Patent No.: US 11,873,918 B1
(45) Date of Patent: Jan. 16, 2024

(54) INTERVAL CONTROL VALVE ACTUATOR, VALVE AND SYSTEM

(71) Applicants: Thomas McClain Scott, Cypress, TX (US); Marc Samuelson, Houston, TX (US); David Schneider, Conroe, TX (US)

(72) Inventors: Thomas McClain Scott, Cypress, TX (US); Marc Samuelson, Houston, TX (US); David Schneider, Conroe, TX (US)

(73) Assignee: BAKER HUGHES OILFIELD OPERATIONS LLC, Houston, TX (US)

(*) Notice: Subject to any disclaimer, the term of this patent is extended or adjusted under 35 U.S.C. 154(b) by 0 days.

(21) Appl. No.: 17/853,082

(22) Filed: Jun. 29, 2022

(51) Int. Cl.
E21B 34/06 (2006.01)
F16K 31/12 (2006.01)
F16K 31/42 (2006.01)

(52) U.S. Cl.
CPC ............ F16K 31/12 (2013.01); E21B 34/063 (2013.01); F16K 31/42 (2013.01)

(58) Field of Classification Search
CPC ...... E21B 34/06; E21B 34/063; E21B 34/066; E21B 34/14; F16K 31/12; F16K 31/42
See application file for complete search history.

(56) References Cited

U.S. PATENT DOCUMENTS

| 10,745,998 B2 * | 8/2020 | Prost ..................... E21B 34/066 |
| 2001/0023928 A1 * | 9/2001 | Green ..................... F15B 15/18 251/62 |

* cited by examiner

Primary Examiner — Matthew R Buck
(74) Attorney, Agent, or Firm — CANTOR COLBURN LLP

(57) ABSTRACT

An interval control valve actuator includes an electrohydraulic pressure generator and an actuation pressure line extending between the generator and a valve. A hydraulic junction disposed in the actuation pressure line is selectively hydraulically joins the actuation pressure line to a backup pressure line. An interval control valve including a housing, a valve disposed in the housing, an electrohydraulic actuator hydraulically connected to the valve by an actuation pressure line. A hydraulic junction disposed between the electrohydraulic actuator and the valve and a backup pressure line hydraulically connected to the hydraulic junction, the backup pressure line being selectively hydraulically connectable to the actuation pressure line.

13 Claims, 5 Drawing Sheets

INTERVAL CONTROL VALVE ACTUATOR, VALVE AND SYSTEM

BACKGROUND

In the resource recovery industry and fluid sequestration industry there is often need to control valves and other deices using electric or electric/hydraulic actuators. The industry is generally moving toward electrically actuated devices but there is still great skepticism in the art. Configurations that support employment of electric actuators and are better received by the art is a benefit to the industry.

SUMMARY

An interval control valve actuator includes an electrohydraulic pressure generator and an actuation pressure line extending between the generator and a valve. A hydraulic junction is disposed in the actuation pressure line, the junction selectively hydraulically joining the actuation pressure line to a backup pressure line.

An interval control valve includes a housing, a valve disposed in the housing, an electrohydraulic actuator hydraulically connected to the valve by an actuation pressure line, and a hydraulic junction disposed between the electrohydraulic actuator and the valve. A backup pressure line is hydraulically connected to the hydraulic junction, the backup pressure line being selectively hydraulically connectable to the actuation pressure line.

An embodiment of a borehole system including a borehole in a subsurface formation, a string in the borehole, an actuator and a valve disposed in the string

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
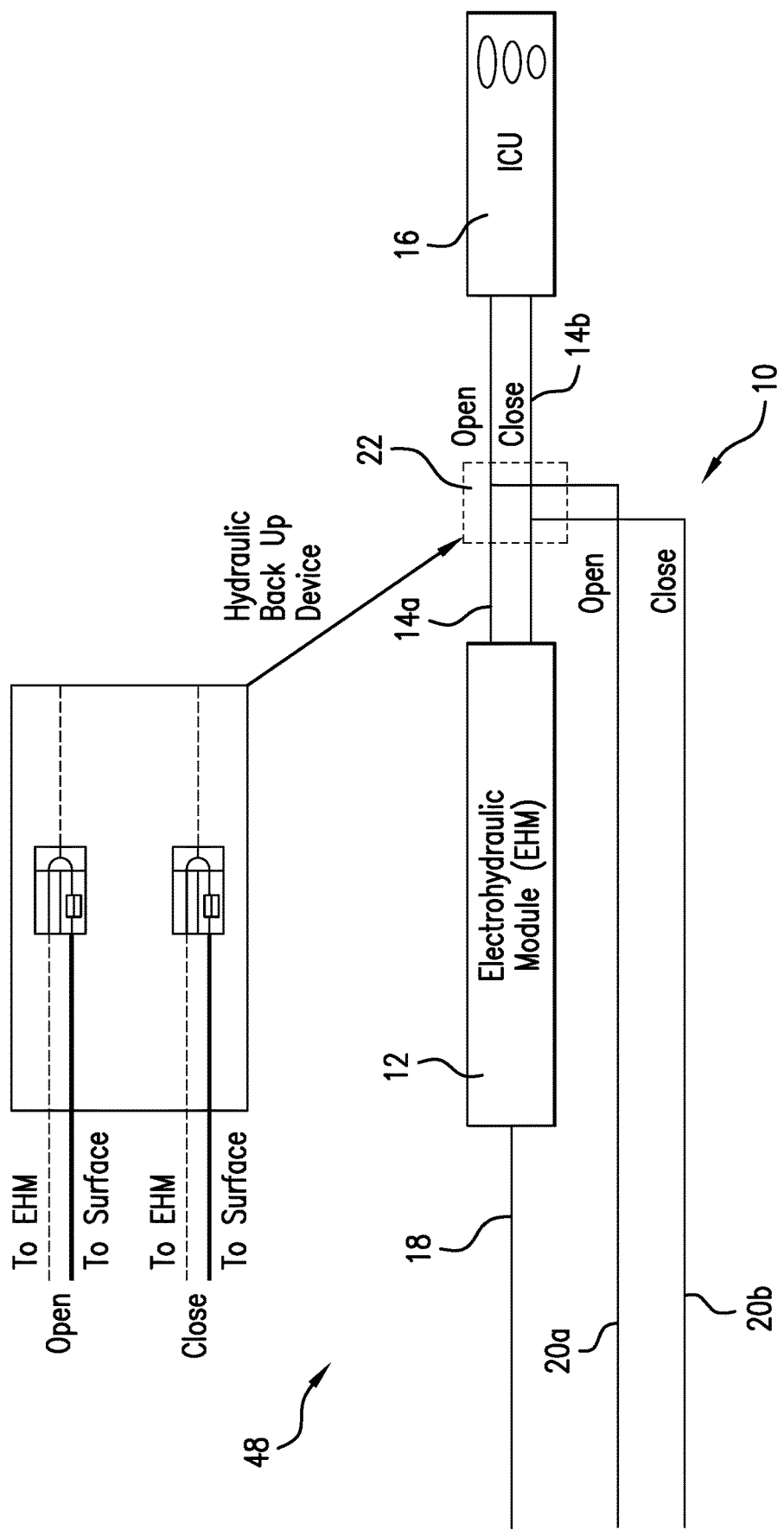
FIG. 1 is a schematic view of an interval control valve actuator and an interval control valve as disclosed herein.
Figure 2:
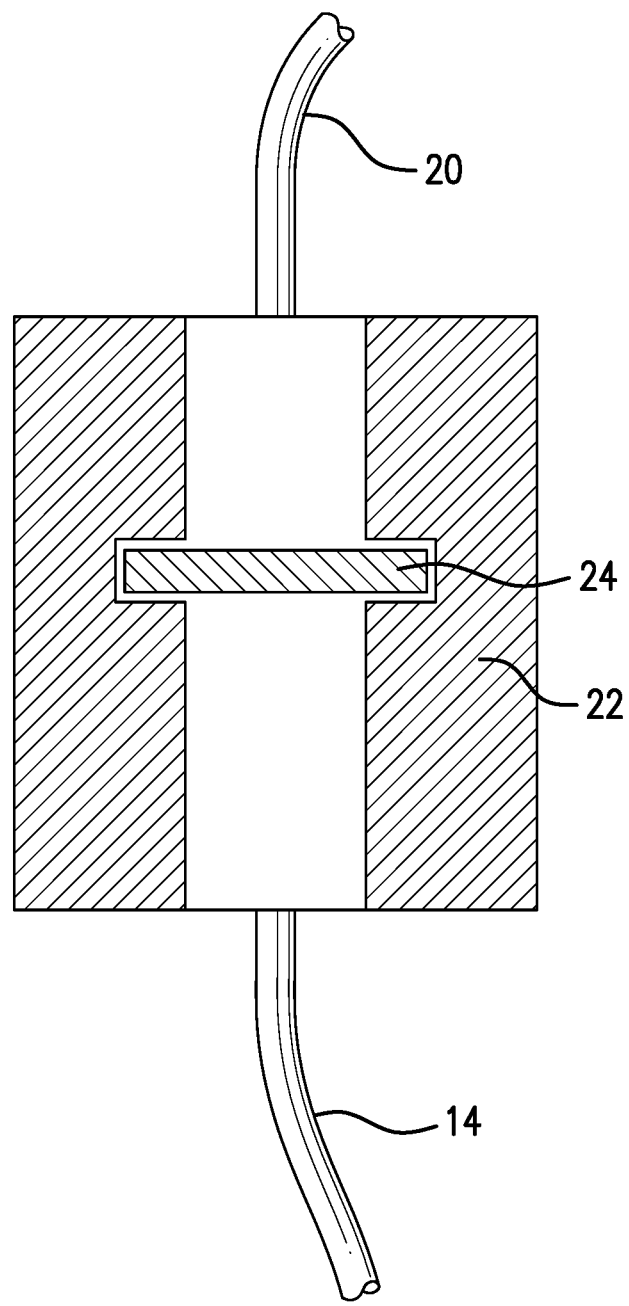
FIG. 2 is a schematic enlarged view of a first embodiment of a hydraulic junction illustrated employing a rupture disk.

Referring to FIG. 1, an interval control valve actuator 10 is illustrated schematically. The actuator 10 includes an electrohydraulic pressure generator 12 that is hydraulically connected to one or more pressure actuation lines 14. In FIG. 1, there are two lines 14. The lines 14 are designated open line 14a and close line 14b. The lines 14a and 14b extend to and hydraulically connect with an interval control valve 16 such as a sliding sleeve valve or other valve or device that depends upon a pressure event applied thereto in order to change an operating condition thereof. The electrohydraulic pressure generator 12 is connected electrically to an electric supply 18. Supply 18 may be an electric line that extends to surface or a local source of power such as an electrical generator or a battery. Upon an electrical signal through the electric supply 18, the generator 12 will pressurize line 14a or line 14b to change the operating condition of the valve or device 16.

In the event of a loss of electrical continuity from supply 18, a back up line(s) is configured to operate the valve or device 16. Two lines 20 are illustrated in FIG. 1, a backup open line designated 20a and a backup close line designated 20b. lines 20a and 20b terminate in a hydraulic junction 22 that provides and also temporarily blocks a hydraulic connection between lines 14a and 20a and a hydraulic connection between lines 14b and 20b.

The junction 22 may be configured in a few different embodiments, with examples illustrated in FIGS. 2-6. In a first embodiment, referring to FIG. 2, the junction 22 may include a rupture disk 24 for each backup line 20 that is, but for the disk, hydraulically connected to the corresponding actuation line. 14. Pressure from the line 20 that exceeds the structural integrity of the disk 24 causes the disk 24 to rupture and allow fluid formerly on either side of disk 24 to comingle hence allowing pressure in line 20 to communicate to its corresponding line 14. The disk 24 in an embodiment may be rate to a higher pressure than can be generated by the pressure generator 12 and so will not have any effect during normal operation of the actuator but if electric power is lost or the generator 12 fails, pressure applied in line 20 may be raised sufficiently to rupture the disk 24 and allow actuation of the ICV 16 based upon line 20 pressure. Regardless of the number of lines to be used in the embodiment, a disk may be installed for each one to secure proper operation of valve or device 16. In the view of FIG. 1, there would be two disks 24 in the junction 22.

Figure 3:
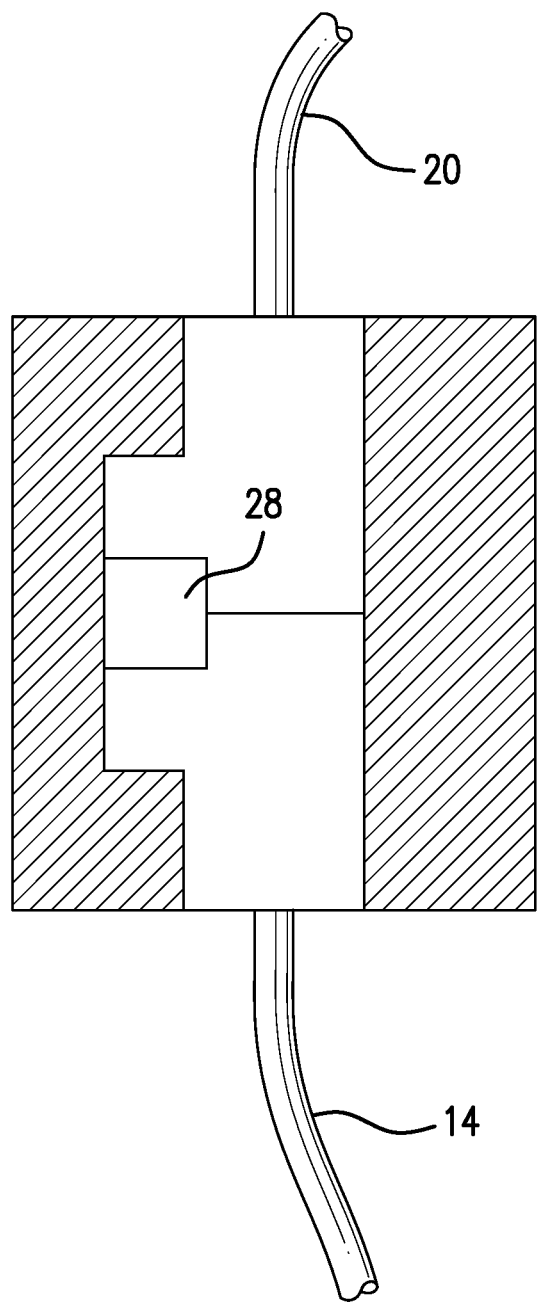
FIG. 3 is a schematic enlarged view of a second embodiment of a hydraulic junction illustrated employing a solenoid valve.
Figure 4:
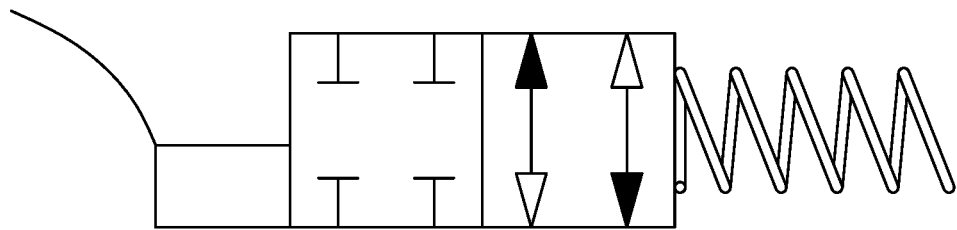
FIG. 4 is a schematic illustration of a multi line solenoid valve.
Figure 5:
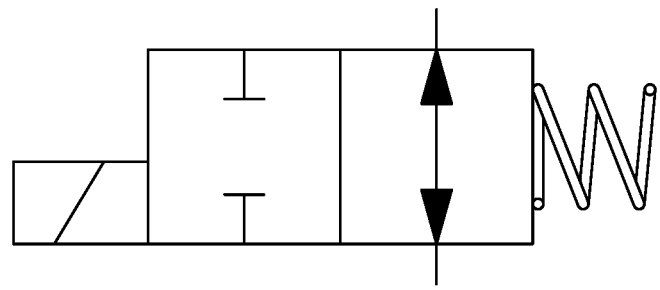
FIG. 5 is a schematic illustration of a single line solenoid valve.

In another embodiment, referring to FIG. 3, a solenoid valve 28 is employed in the junction 22. The solenoid valve is configured to open upon loss of control power. Accordingly, if power is lost to the generator 12, the power is also lost to the junction 22 will result in the solenoid valve 28 opening to the one or more backup lines 20. As applied to FIG. 1, there would be either a two-line solenoid valve (see FIG. 4) or two single line solenoid valves (see FIG. 5) for connection of line 14a to line and line 14b to line 20b. Solenoid valves are well known and do not require specific enablement themselves. More or fewer lines and solenoid valve types are contemplated.

DETAILED DESCRIPTION

Figure 6:
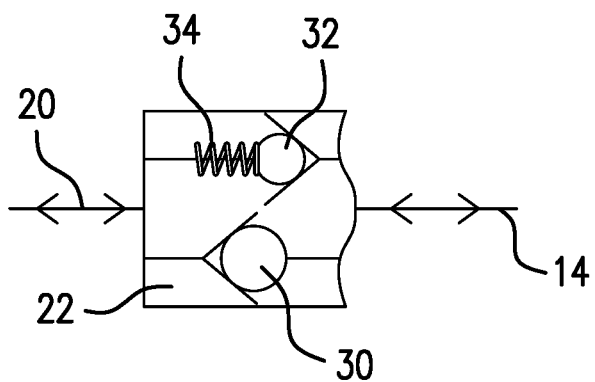
FIG. 6 is a schematic enlarged view of a third embodiment of a hydraulic junction illustrated employing a check valve system.

Referring to FIG. 6, a junction 22 is configured with a check valve 30 and back check 32 with a spring 34 for each line 20 that is connected thereto. The configuration allows applied pressure through line 20 to actuate the valve or device 16 simply by overcoming pressure downhole. The check valve 30 prevents pressurized fluid downhole from generator 12 from escaping up the line 20. In order to avoid a lock in situation, the back check 32 is provided with a spring (coil, rubber, gas, etc.) that is configured to hold the back check 32 closed until a threshold pressure is exceeded, that pressure being substantially higher than any pressure used by the actuator 10 during normal (not backup) operation.

Figure 7:
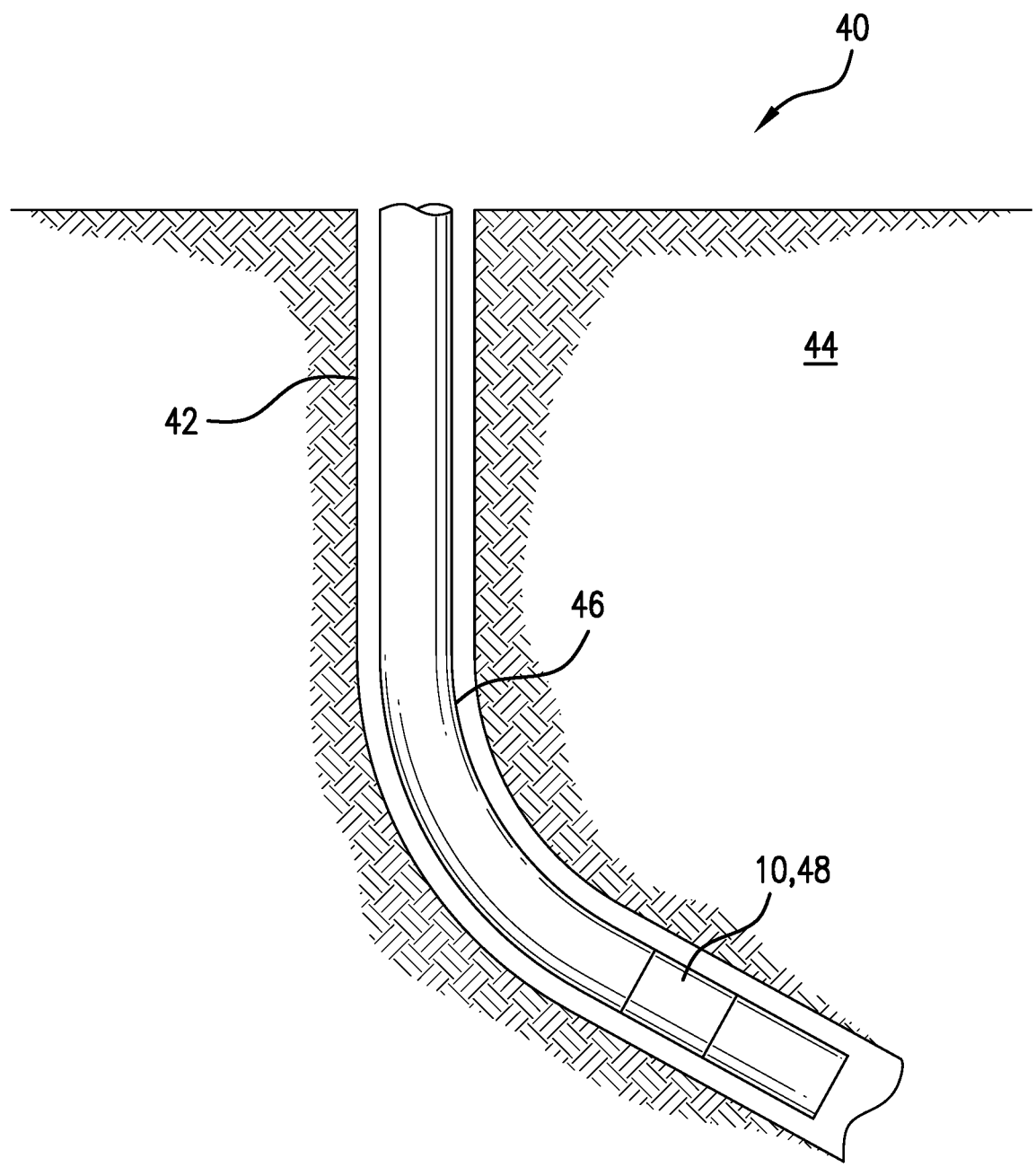
FIG. 7 is a view of a borehole system including the actuator or valve as disclosed herein.

Referring to FIG. 7, a borehole system 40 is illustrated. The system 40 comprises a borehole 42 in a subsurface formation 44. A string 46 is disposed within the borehole 42. An interval control valve actuator 10 or an interval control valve (including the actuator 10) 48 (also illustrated in FIG. 1) is disposed within or as a part of the string 46 disclosed herein.

Set forth below are some embodiments of the foregoing disclosure:

Embodiment 1: An interval control valve actuator includes an electrohydraulic pressure generator, an actuation pressure line extending between the generator and a valve, and a hydraulic junction disposed in the actuation pressure line, the junction selectively hydraulically joining the actuation pressure line to a backup pressure line.

Embodiment 2: The interval control valve actuator as in any prior embodiment wherein the actuation pressure line is a plurality of actuation pressure lines.

Embodiment 3: The interval control valve actuator as in any prior embodiment wherein the hydraulic junction is a plurality of hydraulic junctions.

Embodiment 4: The interval control valve actuator as in any prior embodiment wherein the hydraulic junction comprises a rupture disk.

Embodiment 5: The interval control valve actuator as in any prior embodiment wherein the hydraulic junction comprises a solenoid valve.

Embodiment 6: The interval control valve actuator as in any prior embodiment wherein the solenoid valve is normally open such that upon loss of electrical power thereto the solenoid valve automatically moves to an open position.

Embodiment 7: The interval control valve actuator as in any prior embodiment wherein the backup pressure line is a plurality of backup pressure lines.

Embodiment 8: The interval control valve actuator as in any prior embodiment wherein the plurality of backup pressure lines includes a plurality of opening pressure lines plumbed to a plurality of valves and a common close pressure line plumbed to each of the valves.

Embodiment 9: The interval control valve actuator as in any prior embodiment wherein the hydraulic junction includes a check valve between the actuation pressure line and the backup pressure line.

Embodiment 10: An interval control valve includes a housing, a valve disposed in the housing, an electrohydraulic actuator hydraulically connected to the valve by an actuation pressure line, a hydraulic junction disposed between the electrohydraulic actuator and the valve; and a backup pressure line hydraulically connected to the hydraulic junction, the backup pressure line being selectively hydraulically connectable to the actuation pressure line.

Embodiment 11: The interval control valve as in any prior embodiment wherein the hydraulic junction comprises a rupture disk.

Embodiment 12: The interval control valve as in any prior embodiment wherein the hydraulic junction comprises a solenoid valve.

Embodiment 13: The interval control valve as in any prior embodiment wherein the solenoid valve is normally open such that upon loss of electrical power thereto the solenoid valve automatically moves to an open position.

Embodiment 14: A borehole system includes a borehole in a subsurface formation, a string in the borehole, and an actuator as in any prior embodiment disposed in the string.

Embodiment 15: A borehole system includes a borehole in a subsurface formation, a string in the borehole a valve as in any prior embodiment disposed in the string.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% or 5%, or 2% of a given value.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. An interval control valve actuator comprising:
an electrohydraulic pressure generator;
an actuation pressure line extending between the generator and a valve; and
a hydraulic junction disposed in the actuation pressure line, the junction selectively hydraulically joining the actuation pressure line to a plurality of backup opening pressure lines plumed to a plurality of valves and a common close pressure line plumed to each of the valves.

2. The actuator as claimed in claim 1 wherein the actuation pressure line is a plurality of actuation pressure lines.

3. The actuator as claimed in claim 1 wherein the hydraulic junction is a plurality of hydraulic junctions.

4. The actuator as claimed in claim 1 wherein the hydraulic junction comprises a rupture disk.

5. The actuator as claimed in claim 1 wherein the hydraulic junction comprises a solenoid valve.

6. The actuator as claimed in claim 5 wherein the solenoid valve is normally closed such that upon loss of electrical power thereto the solenoid valve automatically moves to an open position.

7. The actuator as claimed in claim 1 wherein the hydraulic junction includes a check valve between the actuation pressure line and the backup pressure line.

8. A borehole system comprising:
a borehole in a subsurface formation;
a string in the borehole; and
an actuator as claimed in claim 1 disposed in the string.

9. An interval control valve comprising:
a housing;
a valve disposed in the housing;
an electrohydraulic actuator hydraulically connected to the valve by an actuation pressure line;
a hydraulic junction disposed between the electrohydraulic actuator and the valve; and
a plurality of backup opening pressure lines plumbed to a plurality of valves and hydraulically connected to the hydraulic junction, the plurality of backup pressure lines being selectively hydraulically connectable to the actuation pressure line and a common closed pressure line plumbed to each of the valves.

10. The valve as claimed in claim 9 wherein the hydraulic junction comprises a rupture disk.

11. The valve as claimed in claim 9 wherein the hydraulic junction comprises a solenoid valve.

12. The valve as claimed in claim 11 wherein the solenoid valve is normally closed such that upon loss of electrical power thereto the solenoid valve automatically moves to an open position.

13. A borehole system comprising:
a borehole in a subsurface formation;
a string in the borehole; and
a valve as claimed in claim 9 disposed in the string.

* * * * *